United States Patent
Wittenberg et al.

(10) Patent No.: US 7,307,650 B2
(45) Date of Patent: Dec. 11, 2007

(54) ARRANGEMENT FOR, AND A METHOD OF, REDUCING IMAGE DISTORTION DUE TO ELECTRICAL INTERFERENCE

(75) Inventors: Carl Wittenberg, Water Mill, NY (US); Dmitriy Yavid, Stony Brook, NY (US)

(73) Assignee: Symbol Technologies, Inc., Holtsville, NY (US)

(*) Notice: Subject to any disclaimer, the term of this patent is extended or adjusted under 35 U.S.C. 154(b) by 183 days.

(21) Appl. No.: 11/165,737

(22) Filed: Jun. 24, 2005

(65) Prior Publication Data
US 2006/0290774 A1    Dec. 28, 2006

(51) Int. Cl.
*B41J 27/00* (2006.01)
*G02F 26/08* (2006.01)

(52) U.S. Cl. ............... 347/243; 347/259; 347/260; 359/203; 359/197

(58) Field of Classification Search ........... 347/243, 347/259, 253; 359/203, 197
See application file for complete search history.

(56) References Cited

U.S. PATENT DOCUMENTS

| | | | | |
|---|---|---|---|---|
| 4,387,297 A | * | 6/1983 | Swartz et al. | 235/462.21 |
| 4,732,440 A | * | 3/1988 | Gadhok | 359/214 |
| 6,245,590 B1 | * | 6/2001 | Wine et al. | 438/52 |
| 7,006,274 B1 | * | 2/2006 | Wittenberg et al. | 359/285 |
| 7,227,294 B2 | * | 6/2007 | Mazz et al. | 310/317 |
| 2005/0057727 A1 | * | 3/2005 | Troyer | 353/31 |
| 2006/0087628 A1 | * | 4/2006 | Dvorkis et al. | 353/121 |

\* cited by examiner

*Primary Examiner*—Lamson Nguyen
*Assistant Examiner*—Sarah Al-Hashimi
(74) *Attorney, Agent, or Firm*—Kirschstein et al.

(57) ABSTRACT

Electrical interference between resonant, drive and line frequencies in a drive is reduced by selecting the resonant frequency to be non-harmonically related to the drive and line frequencies. The drive is of beneficial use in a lightweight, compact image projection module operative for causing selected pixels in a raster pattern to be illuminated to produce a non-distorted image of high resolution of VGA quality in color.

15 Claims, 10 Drawing Sheets

FIG. 7 CON'T

ARRANGEMENT FOR, AND A METHOD OF, REDUCING IMAGE DISTORTION DUE TO ELECTRICAL INTERFERENCE

BACKGROUND OF THE INVENTION

1. Field of the Invention

The present invention generally relates to an arrangement for, and a method of, reducing image distortion due to electrical interference, especially for use in a color image projection system operative for projecting a two-dimensional image in color while maintaining low power consumption, high resolution, miniature compact size, quiet operation and minimal vibration.

2. Description of the Related Art

It is generally known to project a two-dimensional image on a screen based on a pair of scan mirrors which oscillate by respective drives in mutually orthogonal directions to scan a laser beam over a raster pattern. However, the known image projection arrangements project the image with limited resolution, typically less than a fourth of video-graphics-array (VGA) quality of 640×480 pixels, consume a relatively large amount of electrical power, and are relatively heavy in weight and occupy a relatively large volume, thereby rendering them impractical for use in miniature, hand-held, battery-operated applications. The image also suffers from electrical interference.

For example, the drive for one of the scan mirrors includes a permanent magnet jointly movable with the mirror. The magnet and the mirror are mounted on a flexure that permits oscillation about an axis. An electromagnetic coil is energized by a periodic drive signal having a drive frequency and generates an electromagnetic field which interacts with the permanent field of the magnet to flex the flexure and cause the magnet and, in turn, the scan mirror to move in one direction about the axis at a constant drive speed. The scan mirror is self-returnable at a resonant frequency in an opposite direction about the axis at a return speed greater than the drive speed.

Although generally satisfactory for its intended purpose, the above-described electromagnetic drive is not ideal for projecting a non-distorted image. For example, the drive frequency of the drive signal and/or an AC supply line frequency for energizing the drive and/or harmonics of the drive frequency and the line frequency may electrically interfere with the resonant frequency and with one another, thereby corrupting the constant drive speed and leading to image distortion.

SUMMARY OF THE INVENTION

Objects of the Invention

Accordingly, it is a general object of this invention to provide an arrangement for, and a method of, reducing image distortion, especially for use in an image projection system that projects a sharp and clear, two-dimensional color image over an extended range of distances away from the system.

Another object of this invention is to reduce the electrical interference between the drive frequency and the resonant frequency of a drive used in such systems.

Still another object of this invention is to reduce the electrical interference between the supply line frequency and the resonant frequency of a drive used in such systems.

An additional object is to provide a miniature, compact, lightweight, energy-efficient, and portable color image projection arrangement useful in many instruments of different form factors, especially hand-held instruments.

FEATURES OF THE INVENTION

In keeping with these objects and others which will become apparent hereinafter, one feature of this invention resides, briefly stated, in an arrangement for, and a method of, reducing image distortion in a projected image by minimizing electrical interference, as detailed below. A light source, for example, a single laser, is operative for generating a laser beam for creating a monochromatic image. For a color image, the light source includes a plurality of lasers of different wavelengths (red, blue and green) which are arranged as a composite beam.

A drive assembly is operative for oscillating a pair of scan mirrors about mutually orthogonal axes to form a raster pattern of scan lines on a projection surface, such as a screen, each scan line having a number of pixels. The drive assembly includes a drive, also sometimes referred to herein as the Y-drive, operable at a drive frequency for moving one of the scan mirrors, also sometimes referred to herein as the Y-mirror, in one circumferential direction about one of the axes at a substantially constant drive speed. The Y-mirror is self-returnable at a resonant frequency in an opposite circumferential direction about the one axis at a return speed greater than the drive speed.

A controller, preferably a programmed microprocessor, is operative for causing selected pixels in the scan lines to be illuminated, and rendered visible, by the laser beam to form the image on the projection surface. The image is two-dimensional, and the Y-drive is responsible for "drawing" the image at the drive frequency, i.e., the video frame rate, between an upper scan line and a lower scan line of the raster pattern. More particularly, as described above, the Y-drive drives the Y-mirror at the substantially constant drive speed from the upper scan line to the lower scan line, and thereupon, the Y-mirror self-returns from the lower scan line to the upper scan line at the faster return speed, sometime referred to as the flyback speed.

If a harmonic of the drive frequency (typically a video frame rate of 60 Hz or 85 Hz is common, but other frame rates in common use are 56 Hz, 72 Hz and 75 Hz) and/or if a harmonic of the AC supply line frequency (typically 50 Hz or 60 Hz) used to energize the Y-drive, closely matches the resonant frequency of the Y-mirror, then there is a likelihood of electrical interference in which a sinusoidal transient gets superimposed on the substantially constant drive speed of the Y-mirror, thereby leading to undesirable image distortion. In accordance with this invention, the resonant frequency of the Y-mirror is adjusted to be non-harmonically related to the drive and line frequencies. The resonant frequency is selected so as not to be an integer multiple of the drive and line frequencies. The resonant frequency should be as high as possible to insure a rapid return, but as low as possible to insure minimal energy consumption.

In a preferred embodiment, the Y-drive is an electromagnetic drive having a taut flexure mounted on a support. The flexure has a pair of torsion portions extending along the one axis. The flexure is flexed by magnetic field interaction. A permanent magnet is mounted on the flexure, and an electromagnetic coil is mounted on the support. In response to a periodic drive signal applied to the coil, a periodic electromagnetic field is produced which interacts with a permanent magnetic field of the magnet.

The magnet and the scan mirror are preferably mounted on a support portion of the flexure intermediate the torsion portions. The flexure has end portions spaced apart along the axis. One of the end portions is anchored to the support. The other of the end portions provides the means for tensioning the flexure to a taut state. Preferably, a resilient flap is formed in the other end portion. This flap resiliently bears against the support and pushes the end portions axially away from one another to the taut state.

In operation, the magnet is oscillated by the magnetic field interaction described above. This causes the support portion of the flexure and the scan mirror to move in one circumferential direction, thereby twisting the torsion portions in one circumferential direction. The energy stored in the twisted torsion portions is then released, thereby untwisting the torsion portions in the opposite circumferential direction. The flexure is constantly tensioned by the flap during these twisting movements, thereby assuring that no erratic, unintended flexure movements occur. Vibration dampers can be used to attenuate undesired vibrations.

In the preferred embodiment, the resonant frequency is adjusted to be non-harmonically related to the drive and line frequencies by controlling the transverse dimension of each torsion portion. For example, the thickness of the transverse dimension is selected such that the resonant frequency of the Y-mirror is not an integer multiple of the drive or line frequencies. The thickness of the transverse dimension is controlled, preferably by chemical etching, to achieve a high degree of accuracy. The resonant frequency can also be controlled by adjusting the mass of the Y-mirror, the mass of the permanent magnet, or the material used for the flexure. However, it is preferred to keep the mass of the Y-mirror and of the magnet, as well as the flexure material, the same, and to just control the thickness of the torsion portions.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figures 1, 2:
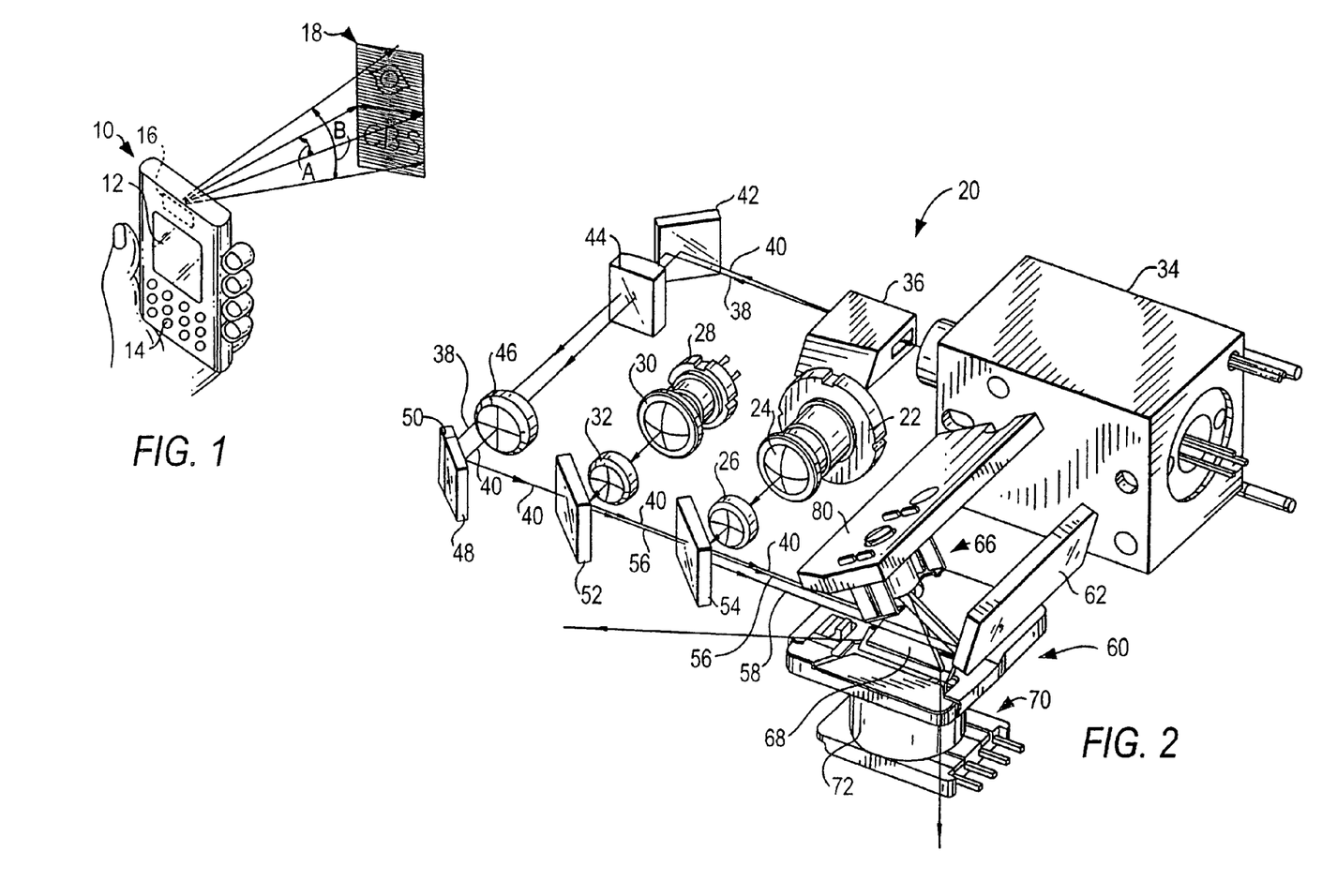
FIG. 1 is a perspective view of a hand-held instrument projecting an image at a working distance therefrom.
FIG. 2 is an enlarged, overhead, perspective view of an image projection system for installation in the instrument of FIG. 1.

Reference numeral 10 in FIG. 1 generally identifies a hand-held instrument, for example, a personal digital assistant, in which a lightweight, compact, image projection arrangement 20, as shown in FIG. 2, is mounted and operative for projecting a two-dimensional color image at a variable distance from the instrument. By way of example, an image 18 is situated within a working range of distances relative to the instrument 10.

As shown in FIG. 1, the image 18 extends over an optical horizontal scan angle A extending along the horizontal direction, and over an optical vertical scan angle B extending along the vertical direction, of the image. As described below, the image is comprised of illuminated and non-illuminated pixels on a raster pattern of scan lines swept by a scanner in the arrangement 20.

The parallelepiped shape of the instrument 10 represents just one form factor of a housing in which the arrangement 20 may be implemented. The instrument can be shaped as a pen, a cellular telephone, a clamshell or a wristwatch, as, for example, shown in U.S. patent application Ser. No. 10/090,653, filed Mar. 4, 2002, assigned to the same assignee as the instant application, and incorporated herein by reference thereto.

In the preferred embodiment, the arrangement 20 measures less than about 30 cubic centimeters in volume. This compact, miniature size allows the arrangement 20 to be mounted in housings of many diverse shapes, large or small, portable or stationary, including some having an on-board display 12, a keypad 14, and a window 16 through which the image is projected.

Figure 3:
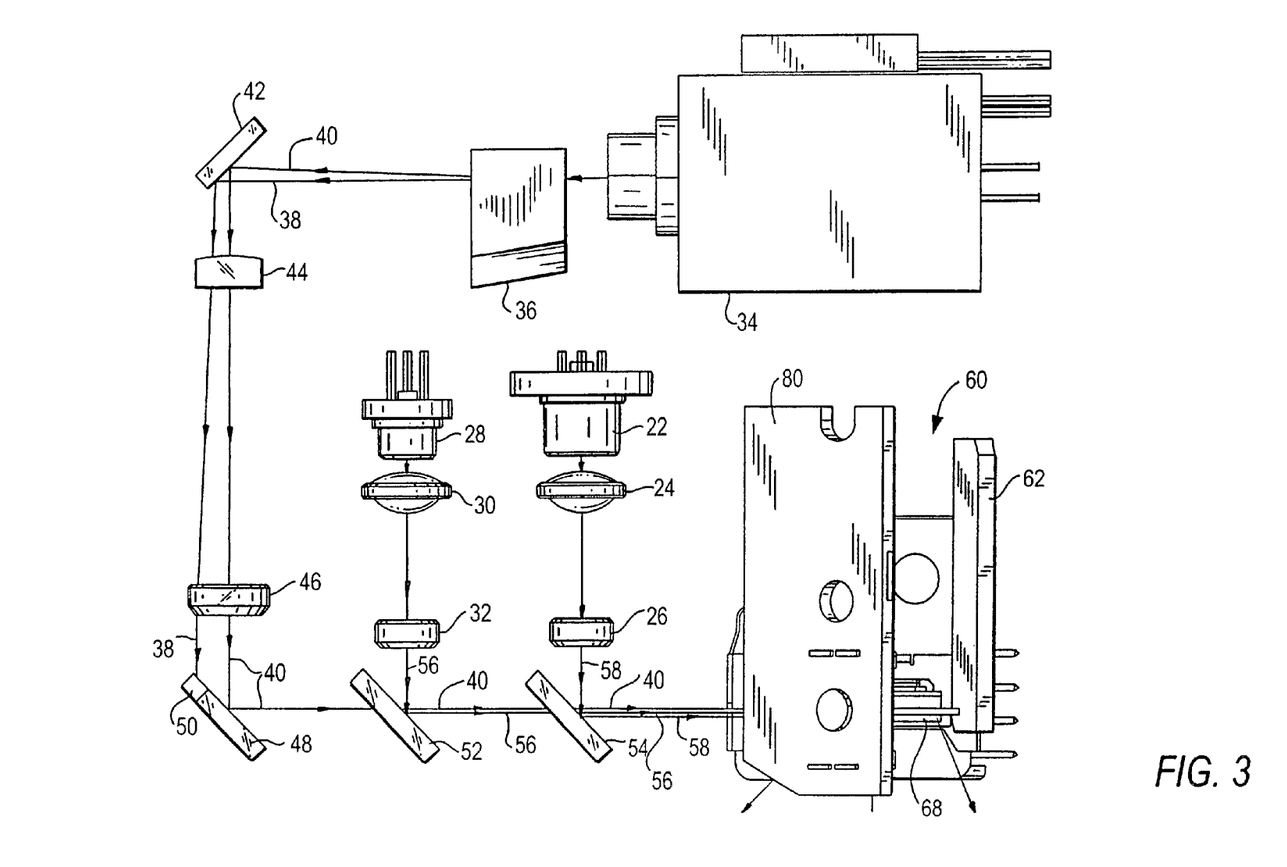
FIG. 3 is a top plan view of the system of FIG. 2.

Referring to FIGS. 2 and 3, the arrangement 20 includes a semiconductor laser 22 which, when energized, emits a bright red laser beam at about 635-655 nanometers. Lens 24 is a biaspheric convex lens having a positive focal length and is operative for collecting virtually all the energy in the red beam and for producing a diffraction-limited beam. Lens 26 is a concave lens having a negative focal length. Lenses 24, 26 are held by non-illustrated respective lens holders apart on a support (not illustrated in FIG. 2 for clarity) inside the instrument 10. The lenses 24, 26 shape the red beam profile over the working distance.

Another semiconductor laser 28 is mounted on the support and, when energized, emits a diffraction-limited blue laser beam at about 475-505 nanometers. Another biaspheric convex lens 30 and a concave lens 32 are employed to shape the blue beam profile in a manner analogous to lenses 24, 26.

A green laser beam having a wavelength on the order of 530 nanometers is generated not by a semiconductor laser, but instead by a green module 34 having an infrared diode-pumped YAG crystal laser whose output beam is 1060 nanometers. A non-linear frequency doubling crystal is included in the infrared laser cavity between the two laser mirrors. Since the infrared laser power inside the cavity is much larger than the power coupled outside the cavity, the frequency doubler is more efficient in generating the double frequency green light inside the cavity. The output mirror of the laser is reflective to the 1060 nm infrared radiation, and transmissive to the doubled 530 nm green laser beam. Since the correct operation of the solid-state laser and frequency doubler require precise temperature control, a semiconductor device such as a thermoelectric cooler relying on the Peltier effect is used to control the temperature of the green laser module. The thermoelectric cooler can either heat or cool the device depending on the polarity of the applied current. A thermistor is part of the green laser module in order to monitor its temperature. The readout from the thermistor is fed to the controller, which adjusts the control current to the thermo-electric cooler accordingly.

As explained below, the lasers are pulsed in operation at frequencies on the order of 100 MHz. The red and blue semiconductor lasers 22, 28 can be pulsed at such high frequencies, but the currently available green solid-state lasers cannot. As a result, the green laser beam exiting the green module 34 is pulsed with an acousto-optical modulator (AOM) 36 which creates an acoustic standing wave inside a crystal for diffracting the green beam. The AOM 36, however, produces a zero-order, non-diffracted beam 38 and a first-order, pulsed, diffracted beam 40. The beams 38, 40 diverge from each other and, in order to separate them to eliminate the undesirable zero-order beam 38, the beams 38, 40 are routed along a long, folded path having a folding mirror 42. Alternatively, the AOM can be used either externally or internally to the green laser module to pulse the green laser beam. Other possible ways to modulate the green laser beam include electro-absorption modulation, or Mach-Zender interferometer. The AOM is shown schematically in FIG. 2.

The beams 38, 40 are routed through positive and negative lenses 44, 46. However, only the diffracted green beam 40 is allowed to impinge upon, and reflect from, the folding mirror 48. The non-diffracted beam 38 is absorbed by an absorber 50, preferably mounted on the mirror 48.

The arrangement includes a pair of dichroic filters 52, 54 arranged to make the green, blue and red beams as co-linear as possible before reaching a scanning assembly 60. Filter 52 allows the green beam 40 to pass therethrough, but the blue beam 56 from the blue laser 28 is reflected by the interference effect. Filter 54 allows the green and blue beams 40, 56 to pass therethrough, but the red beam 58 from the red laser 22 is reflected by the interference effect.

The nearly co-linear beams 40, 56, 58 are directed to, and reflected off, a stationary bounce mirror 62. The scanning assembly 60 includes a first scan mirror 64 oscillatable by an inertial drive 66 (shown in isolation in FIGS. 4-5) at a first scan rate to sweep the laser beams reflected off the bounce mirror 62 over the first horizontal scan angle A, and a second scan mirror 68 oscillatable by an electromagnetic drive 70 at a second scan rate to sweep the laser beams reflected off the first scan mirror 64 over the second vertical scan angle B. In a variant construction, the scan mirrors 64, 68 can be replaced by a single two-axis mirror.

Figure 4:
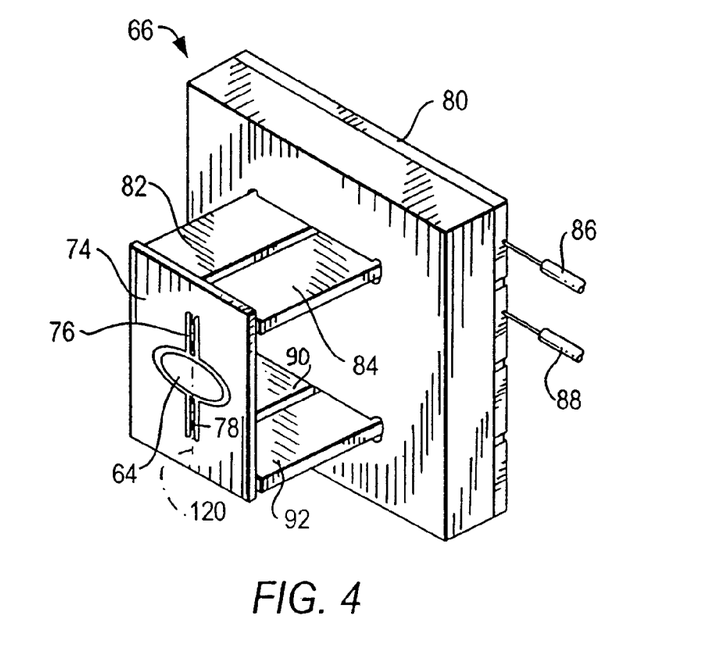
FIG. 4 is a perspective front view of an inertial drive for use in the system of FIG. 2.
Figure 5:
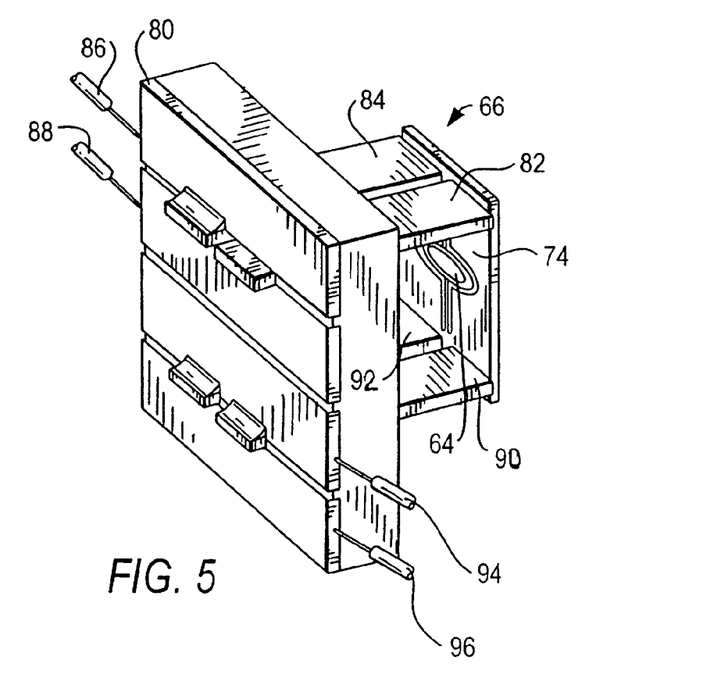
FIG. 5 is a perspective rear view of the inertial drive of FIG. 4.

The inertial drive 66 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto. The use of the inertial drive reduces power consumption of the scanning assembly 60 to less than one watt and, in the case of projecting a color image, as described below, to less than ten watts.

The drive 66 includes a movable frame 74 for supporting the scan mirror 64 by means of a hinge that includes a pair of co-linear hinge portions 76, 78 extending along a hinge axis and connected between opposite regions of the scan mirror 64 and opposite regions of the frame. The frame 74 need not surround the scan mirror 64, as shown.

The frame, hinge portions and scan mirror are fabricated of a one-piece, generally planar, silicon substrate which is approximately 150μ thick. The silicon is etched to form omega-shaped slots having upper parallel slot sections, lower parallel slot sections, and U-shaped central slot sections. The scan mirror 64 preferably has an oval shape and is free to move in the slot sections. In the preferred embodiment, the dimensions along the axes of the oval-shaped scan mirror measure 749μ×1600μ. Each hinge portion measure 27μ in width and 1130μ in length. The frame has a rectangular shape measuring 3100μ in width and 4600μ in length.

The inertial drive is mounted on a generally planar, printed circuit board 80 and is operative for directly moving the frame and, by inertia, for indirectly oscillating the scan mirror 64 about the hinge axis. One embodiment of the inertial drive includes a pair of piezoelectric transducers 82, 84 extending perpendicularly of the board 80 and into contact with spaced apart portions of the frame 74 at either side of hinge portion 76. An adhesive may be used to insure a permanent contact between one end of each transducer and each frame portion. The opposite end of each transducer projects out of the rear of the board 80 and is electrically connected by wires 86, 88 to a periodic alternating voltage source (not shown).

In use, the periodic signal applies a periodic drive voltage to each transducer and causes the respective transducer to alternatingly extend and contract in length. When transducer 82 extends, transducer 84 contracts, and vice versa, thereby simultaneously pushing and pulling the spaced apart frame portions and causing the frame to twist about the hinge axis. The drive voltage has a frequency corresponding to the resonant frequency of the scan mirror. The scan mirror is moved from its initial rest position until it also oscillates about the hinge axis at the resonant frequency. In a preferred embodiment, the frame and the scan mirror are about 150μ thick, and the scan mirror has a high Q factor. A movement on the order of 1μ by each transducer can cause oscillation of the scan mirror at scan rates in excess of 20 kHz.

Another pair of piezoelectric transducers 90, 92 extends perpendicularly of the board 80 and into permanent contact with spaced apart portions of the frame 74 at either side of hinge portion 78. Transducers 90, 92 serve as feedback devices to monitor the oscillating movement of the frame and to generate and conduct electrical feedback signals along wires 94, 96 to a feedback control circuit (not shown).

Alternately, instead of using piezo-electric transducers 90, 92 for feedback, magnetic feedback can be used, where a magnet is mounted on the back of the high-speed mirror, and an external coil is used to pickup the changing magnetic field generated by the oscillating magnet.

Although light can reflect off an outer surface of the scan mirror, it is desirable to coat the surface of the mirror 64 with a specular coating made of gold, silver, aluminum, or a specialty designed highly reflective dielectric coating.

The electromagnetic drive 70 (shown in exploded view in FIG. 8 and in assembled view in FIG. 9) includes a permanent magnet 71 jointly mounted on a flexure 200 and behind the second scan mirror 68, and an electromagnetic coil 72 operative for generating a periodic magnetic field in response to receiving a periodic drive signal. The coil 72 is adjacent the magnet 71 so that the periodic field magnetically interacts with the permanent field of the magnet and causes the magnet and, in turn, the second scan mirror 68 to oscillate, as described in detail below.

The inertial drive 66 oscillates the scan mirror 64 at a high speed at a scan rate preferably greater than 5 kHz and, more particularly, on the order of 18 kHz or more. This high scan rate is at an inaudible frequency, thereby minimizing noise and vibration. The electromagnetic drive 70 oscillates the scan mirror 68 at a slower scan rate which is fast enough to allow the image to persist on a human eye retina without excessive flicker.

The faster mirror 64 sweeps a horizontal scan line, and the slower mirror 68 sweeps the horizontal scan line vertically, thereby creating a raster pattern which is a grid or sequence of roughly parallel scan lines from which the image is constructed. Each scan line has a number of pixels. The image resolution is preferably XGA quality of 1024×768 pixels. Over a limited working range we can display high-definition television standard, denoted 720p, 1270×720 pixels. In some applications, a one-half VGA quality of 320×480 pixels, or one-fourth VGA quality of 320×240 pixels, is sufficient. At minimum, a resolution of 160×160 pixels is desired.

The roles of the mirrors 64, 68 could be reversed so that mirror 68 is the faster, and mirror 64 is the slower. Mirror 64 can also be designed to sweep the vertical scan line, in which event, mirror 68 would sweep the horizontal scan line. Also, the inertial drive can be used to drive the mirror 68. Indeed, either mirror can be driven by an electromechanical, electrical, mechanical, electrostatic, magnetic, or electromagnetic drive.

The slow-mirror is operated in a constant velocity sweep-mode, as described below in connection with FIG. 11, during which time the image is displayed. During the mirror's return, the mirror is swept back into the initial position at its natural or resonant frequency, which is significantly higher. During the mirror's return trip, the lasers can be powered down in order to reduce the power consumption of the device.

Figure 6:
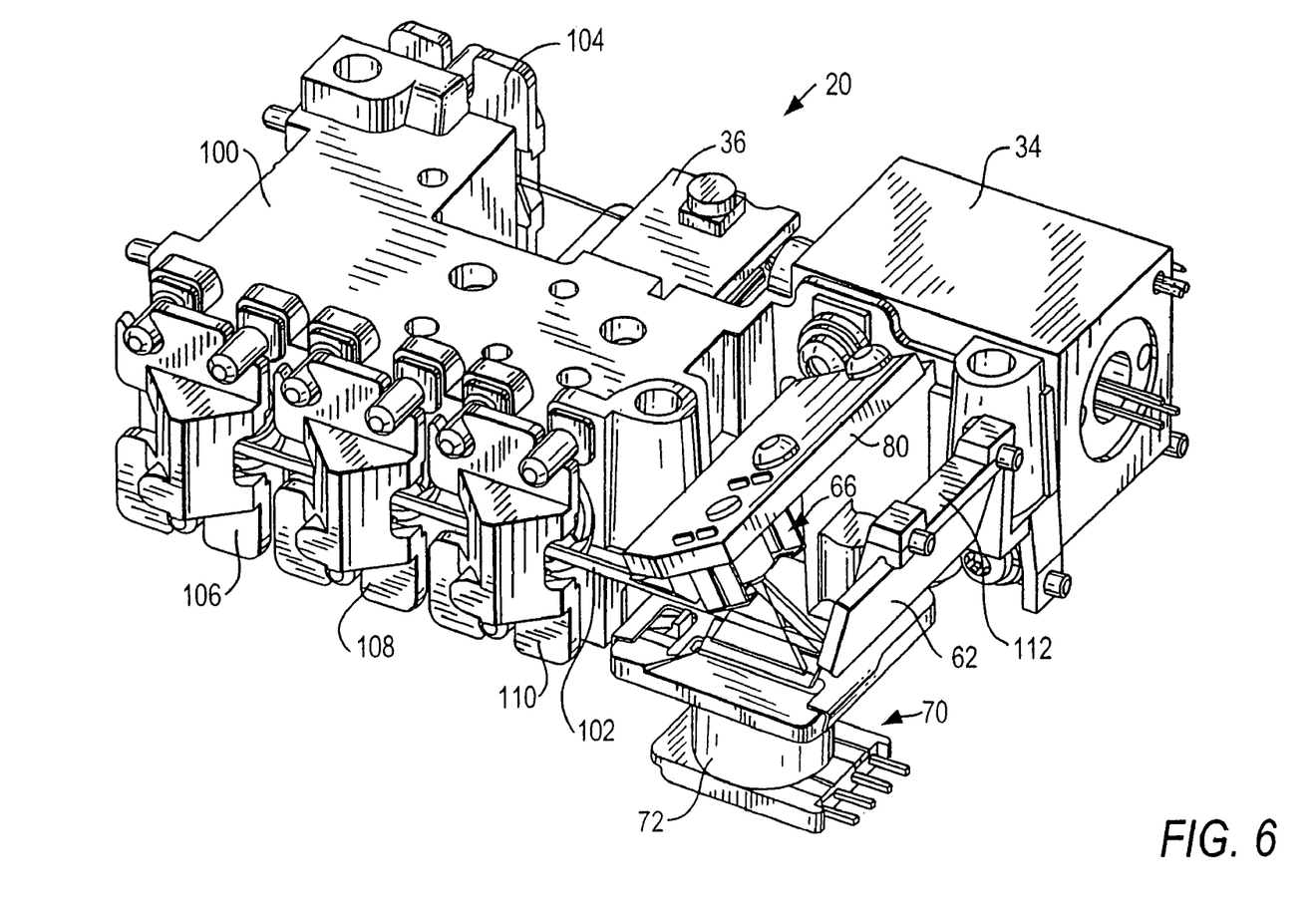
FIG. 6 is a perspective view of a practical implementation of the system of FIG. 2.

FIG. 6 is a practical implementation of the arrangement 20 in the same perspective as that of FIG. 2. The aforementioned components are mounted on a support which includes a top cover 100 and a support plate 102. Holders 104, 106, 108, 110, 112 respectively hold folding mirrors 42, 48, filters 52, 54 and bounce mirror 62 in mutual alignment. Each holder has a plurality of positioning slots for receiving positioning posts stationarily mounted on the support. Thus, the mirrors and filters are correctly positioned. As shown, there are three posts, thereby permitting two angular adjustments and one lateral adjustment. Each holder can be glued in its final position.

The image is constructed by selective illumination of the pixels in one or more of the scan lines. As described below in greater detail with reference to FIG. 7, a controller 114 causes selected pixels in the raster pattern to be illuminated, and rendered visible, by the three laser beams. For example, red, blue and green power controllers 116, 118, 120 respectively conduct electrical currents to the red, blue and green lasers 22, 28, 34 to energize the latter to emit respective light beams at each selected pixel, and do not conduct electrical currents to the red, blue and green lasers to deenergize the latter to non-illuminate the other non-selected pixels. The resulting pattern of illuminated and non-illuminated pixels comprise the image, which can be any display of human- or machine-readable information or graphic.

Referring to FIG. 1, the raster pattern is shown in an enlarged view. Starting at an end point, the laser beams are swept by the inertial drive along the horizontal direction at the horizontal scan rate to an opposite end point to form a scan line. Thereupon, the laser beams are swept by the electromagnetic drive 70 along the vertical direction at the vertical scan rate to another end point to form a second scan line. The formation of successive scan lines proceeds in the same manner.

The image is created in the raster pattern by energizing or pulsing the lasers on and off at selected times under control of the microprocessor 114 or control circuit by operation of the power controllers 116, 118, 120. The lasers produce visible light and are turned on only when a pixel in the desired image is desired to be seen. The color of each pixel is determined by one or more of the colors of the beams. Any color in the visible light spectrum can be formed by the selective superimposition of one or more of the red, blue, and green lasers. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

Figure 7:
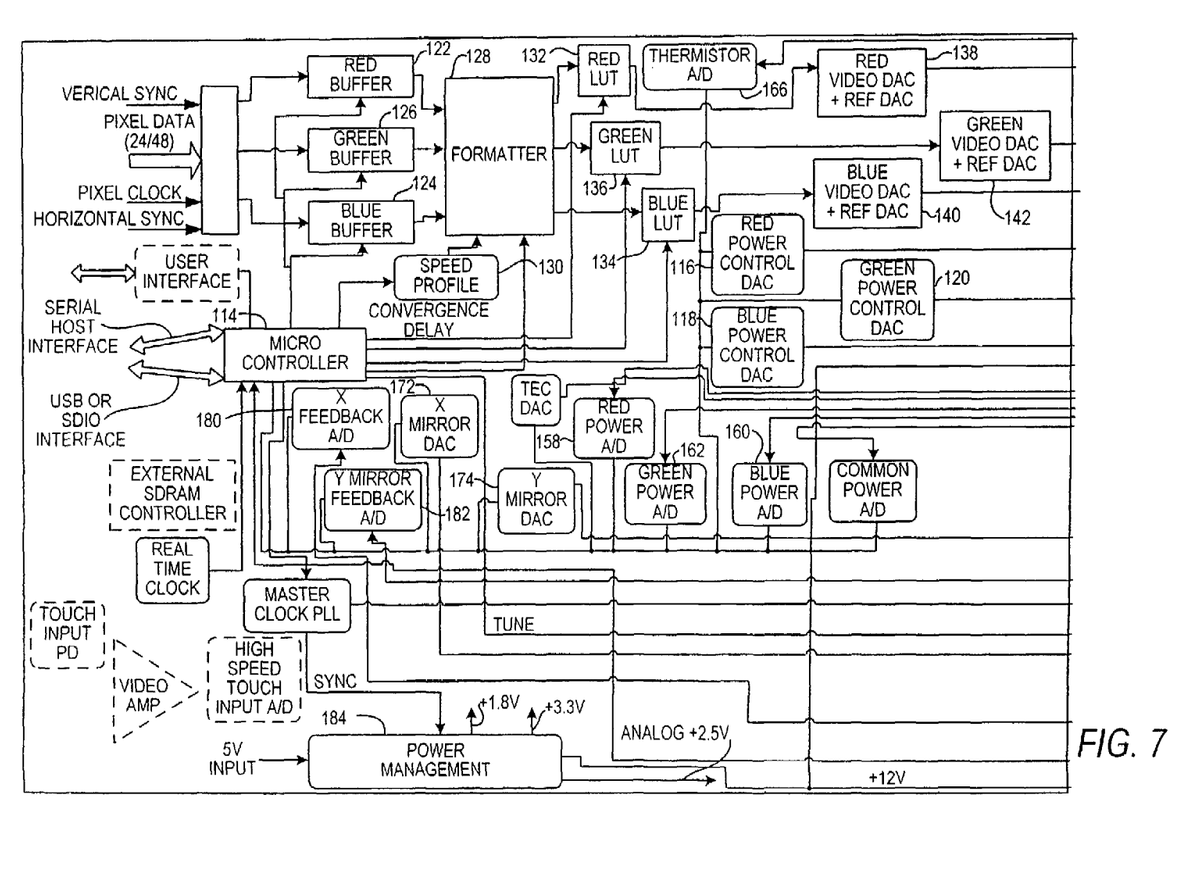
FIG. 7 is an electrical schematic block diagram depicting operation of the system of FIG. 2.

As shown in FIG. 7, an incoming video signal having vertical and horizontal synchronization data, as well as pixel and clock data, is sent to red, blue and green buffers 122, 124, 126 under control of the microprocessor 114. The storage of one full VGA frame requires many kilobytes, and it would be desirable to have enough memory in the buffers for two full frames to enable one frame to be written, while another frame is being processed and projected. The buffered data is sent to a formatter 128 under control of a speed profiler 130 and to red, blue and green look up tables (LUTs) 132, 134, 136 to correct inherent internal distortions caused by scanning, as well as geometrical distortions caused by the angle of the display of the projected image. The resulting red, blue and green digital signals are converted to red, blue and green analog signals by digital to analog converters (DACs) 138, 140, 142. The red and blue analog signals are fed to red and blue laser drivers (LDs) 144, 146 which are also connected to the red and blue power controllers 116, 118. The green analog signal is fed to the AOM radio frequency (RF) driver 150 and, in turn, to the green laser 34 which is also connected to a green LD 148 and to the green power controller 120.

Feedback controls are also shown in FIG. 7, including red, blue and green photodiode amplifiers 152, 154, 156 connected to red, blue and green analog-to-digital (A/D) converters 158, 160, 162 and, in turn, to the microprocessor 114. Heat is monitored by a thermistor amplifier 164 connected to an A/D converter 166 and, in turn, to the microprocessor.

The scan mirrors 64, 68 are driven by drivers 168, 170 which are fed analog drive signals from DACs 172, 174 which are, in turn, connected to the microprocessor. Feedback amplifiers 176, 178 detect the position of the scan mirrors 64, 68, and are connected to feedback A/Ds 180, 182 and, in turn, to the microprocessor.

A power management circuit 184 is operative to minimize power while allowing fast on-times, preferably by keeping the green laser on all the time, and by keeping the current of the red and blue lasers just below the lasing threshold.

A laser safety shut down circuit 186 is operative to shut the lasers off if either of the scan mirrors 64, 68 is detected as being out of position.

Figure 8:
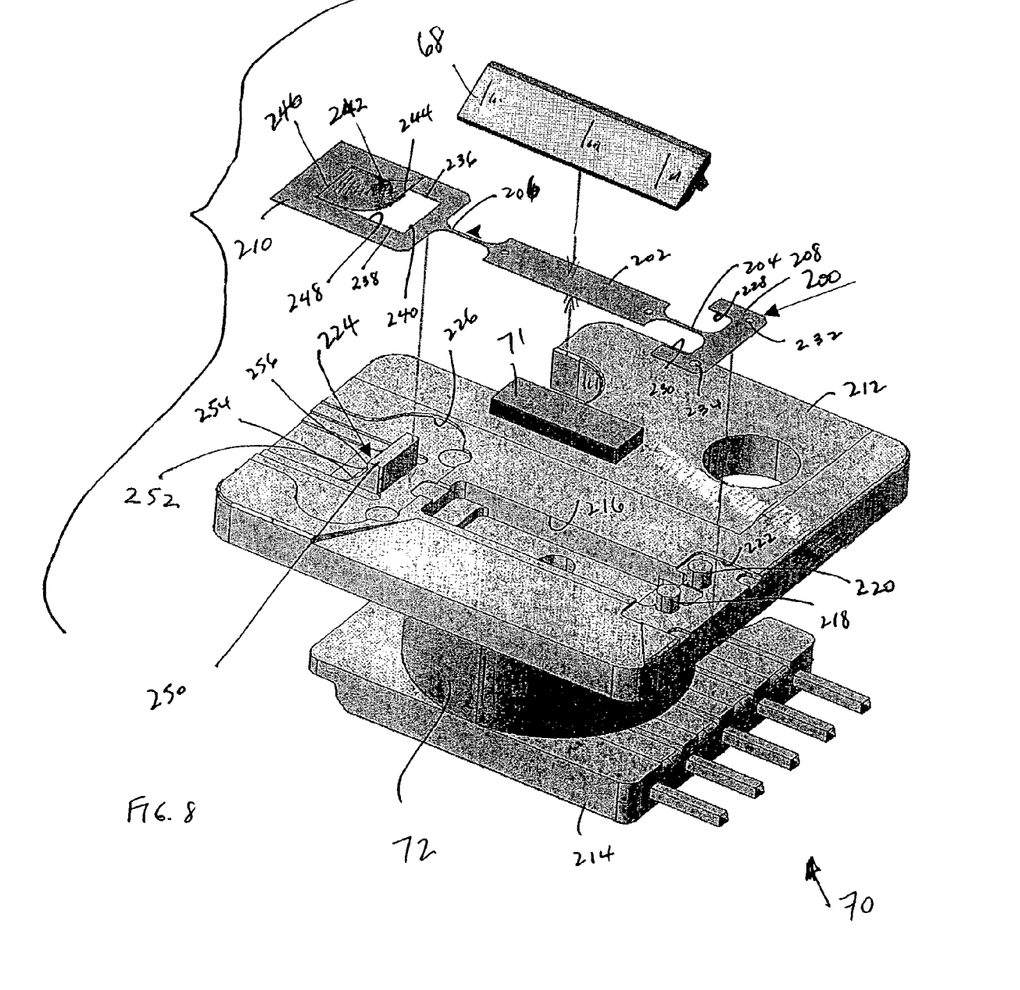
FIG. 8 is an exploded view of a compact drive in accordance with this invention as used in the system of FIG. 6.
Figure 9:
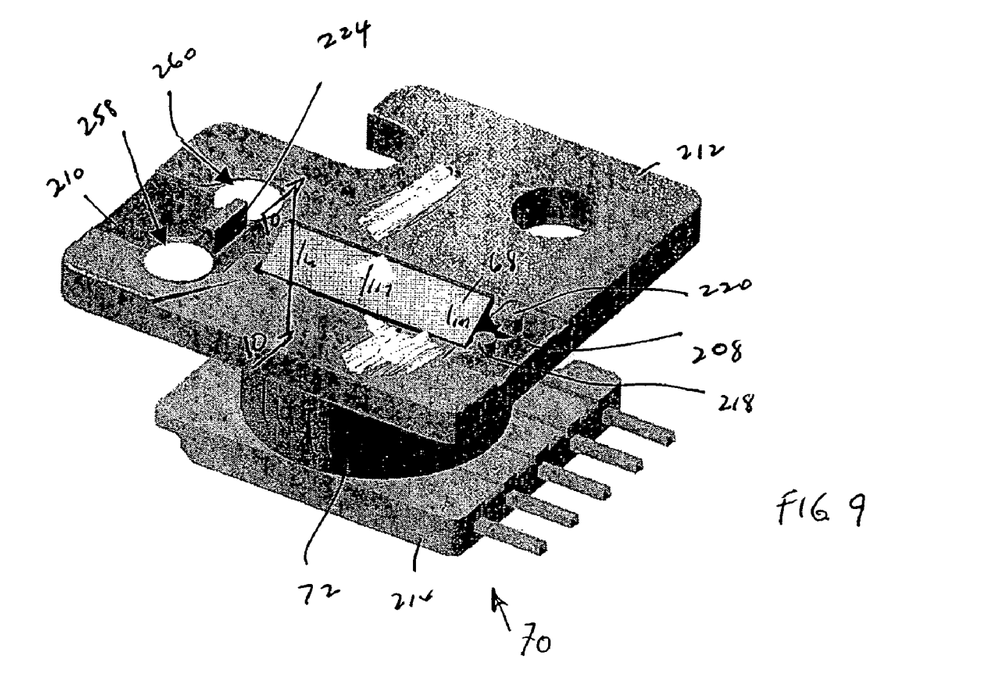
FIG. 9 is an assembled view of the drive of FIG. 8.

Turning now to the electromagnetic drive 70 of FIGS. 8-9, the above-described flexure 200 includes a planar support portion 202, a pair of planar co-linear torsion portions 204, 206, and a pair of planar end portions 208, 210. The flexure is a single elongated piece of resilient material, preferably a tempered stainless steel having a thickness on the order of 0.027 mm. The width of the torsion portions is on the order of 0.122 mm and, although it is possible to machine the flexure with such dimensions, it is preferable to chemically etch the flexure for this purpose. It is the transverse dimensions of the torsion portions which are controlled to adjust the resonant frequency of the scan mirror 68, as described below. The torsion portions are thin, long, wire-like strands which behave as torsion bars, as described below.

The drive 70 includes a molded plastic support having an upper plate 212 and a lower plate 214 between which the coil 72 is sandwiched. The upper plate has an elongated recessed compartment 216 having a top opening, a pair of upright, cylindrical positioning pins 218, 220 mounted in a shallow generally rectangular recess 222, and an upright projection 224 mounted in another shallow recess 226.

The flexure 200 is mounted on the upper plate 212 and longitudinally spans the top opening of the compartment 216. The magnet 71 is mounted on the bottom side of the support portion 202 and lies at least partly within the compartment 216, thereby positioning the magnet 71 closer to the coil than heretofore, and shortening the overall vertical height required for the drive.

The end region 208 is E-shaped and has a pair of cutouts 228, 230 for snugly receiving the pins 220, 218. Inlet holes 232, 234 permit the introduction of a liquid glue to securely anchor the end region 208 in the shallow recess 222.

The end region 210 is shaped as a rectangle and is interiorly formed with two longitudinal cuts 236, 238 and a transverse cut 240, thereby framing and creating a rectangular flap 242. The flap 242 lies in the same plane as the end region 210. For purposes of clarity of illustration, however, the flap 242 in FIG. 8 has been shown in its curved, compressed or buckled state, as described below, in order to better display its free edge 244 which is above the plane of the end region 210 in the taut state. The flap 242 is hinged to the end region 210 at its hinged edge 246 which is parallel to the free edge 244.

When the end region 210 is mounted on the upper plate 212, a top surface 250 of the aforementioned projection 224 engages the underside of the flap 242 adjacent the free edge 244 and pushes the flap to assume the illustrated curved shape. As the flap is bent, it vacates a rectangular cutout 248 in the end region 210. The projection 224 also has a curved surface 252 which is generally of complementary contour to the curvature of the bent flap 242. Actually, the curved surface 252 is designed to insure that the bent flap 242 is not bent past its yield point during assembly, even if the flexure is manually installed with the aid of a tool such as tweezers. In other words, it is not desired to impart a permanent bend to the flap since such a permanent deformation could rob the flap of providing the necessary tension to the flexure as described below. In addition, a limited clearance between the curved surface 252 and the curved flap 242 ensures that a permanent bend will not be imparted to the flap in case of a drop event, that is, where the arrangement experiences sudden shock and deceleration forces when it accidentally hits the ground or other hard surface.

Once the end region 210 is placed flat on the upper plate 212, as shown in the assembled view of FIG. 9, the free edge 244 is captured with a snap-type action in a corner 254 formed between an upright vertical surface 256 and the curved surface 252 of the projection 250. The projection 224 cooperates with the resilient flap 242 to apply tension lengthwise of the flexure, that is, the end region 210 is pushed away from the end region 208. This tension is achieved not by additional discrete components as in the prior art, but instead, by the flap which is integral with the flexure. It is the compression or buckling of the flap that creates a reaction force to tension the torsion portions of the flexure.

The tensioned flexure acts as a restoring spring for the scan mirror 68 mounted thereon. During energization of the coil 72 with a periodic drive signal, a periodic electromagnetic field is propagated which interacts with the permanent field of the magnet 71, thereby causing the magnet to move in one circumferential direction along an axis along which the torsion portions 204, 206 extend. The magnet moves the support portion 202 and the scan mirror 68 and twists the torsion portions 204, 206 in one circumferential direction about the axis relative to the fixed end portions 208, 210 to an end-limiting scan position. Thereupon, the energy stored in the twisted torsion portions is released, thereby moving the support portion 202 and the scan mirror 68, as well as untwisting the torsion portions in the opposite circumferential direction about the axis relative to the fixed end portions 208, 210. This energy release may or may not be aided by the interacting magnetic fields. In any event, the movement of the support portion 202 and the scan mirror continues at a resonant frequency, and the torsion portions 204, 206 are twisted, this time along the opposite circumferential direction, to another end-limiting scan position. This cycle is repeated, thereby oscillating the scan mirror 68 and sweeping any light beam incident on the scan mirror 68 between the end-limiting scan positions. By ensuring that the flexure is tensioned, the scanning movement of the mirror is repeatable, reliable and immune to ambient temperature variations which cause expansion and contraction of the metal flexure.

A pair of vibration dampers 258, 260 is adhered on the end region 210 and the upper plate 212. The dampers serve as visco-elastic dampers designed to attenuate any vibrations in a certain frequency range. The dampers also serve as an additional mechanical anchorage for the end region 210 to resist the flexure becoming dislodged from the projection 224 during a drop event.

As previously noted, the compact drive of this invention is used in a preferred embodiment as the vertical or Y-drive in creating the raster pattern. That means that the light beam incident on the scan mirror is a scan line whose length extends along the horizontal or X-direction of the raster pattern. To accommodate the entire length of the scan line, the scan mirror 68, as shown in FIGS. 8-9, is long in length and short in height. A long scan mirror, however, increases the overall length of the drive and, hence, to decrease the overall length and thereby achieve a compact construction, the scan mirror is designed to at least partially overlap the torsion portions 204, 206. To this end, as shown in FIG. 10, the rear of the scan mirror 68 has a longitudinal recess 262 so that the torsion portions 204, 206 do not contact the scan mirror at its overlapping region.

Figure 10:
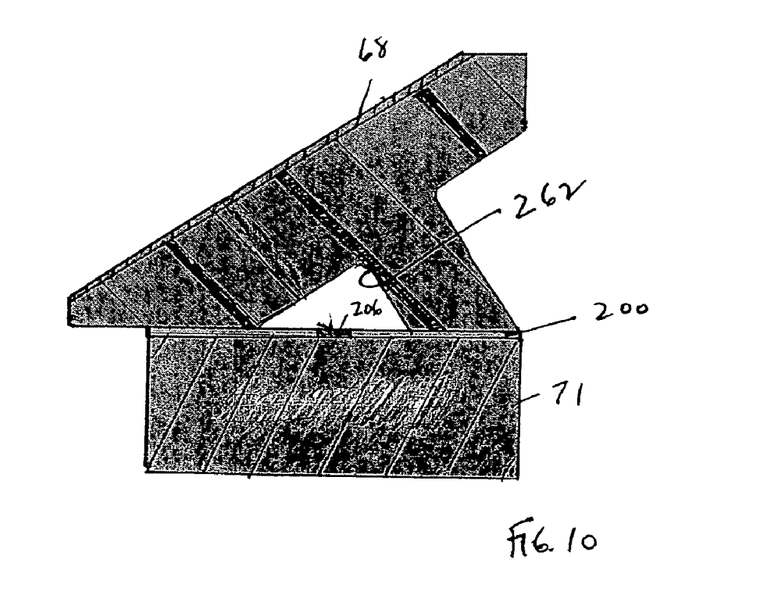
FIG. 10 is an enlarged sectional view taken on line 10-10 of FIG. 9.

The scan mirror 68, as seen in FIG. 10, has a T-shaped cross-section and is preferably an extruded piece of plastic or a drawn piece of glass on which a reflective mirror coating is coated. A long extrusion can be fabricated, and then polished, coated and cut for use in the drive.

Figure 11:
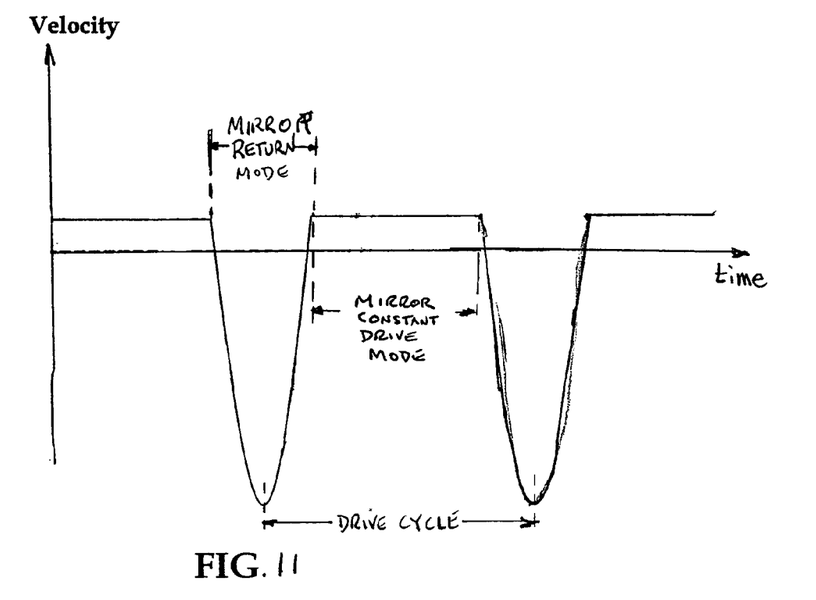
FIG. 11 is a graph depicting velocity versus time for the drive of FIG. 8 under conditions of no electrical interference.

As graphically depicted in FIG. 11, the scan mirror 68 is driven in a drive mode at a substantially constant drive speed during a part of the drive cycle by the electromagnetic drive 70 during which time one frame of the image is displayed. For example, this represents the movement of the scan line from its uppermost position to its lowermost position in the raster pattern, or vice versa. FIG. 11 also depicts a mirror return mode in which the scan mirror returns during the remaining part of the drive cycle. This represents the return movement of the scan line from its lowermost position to its uppermost position in the raster pattern, or vice versa. The return is performed at the resonant frequency of the scan mirror 68 to conserve electrical power and, as shown, is faster than the drive frequency of the drive 70 during the drive mode.

Figure 12:
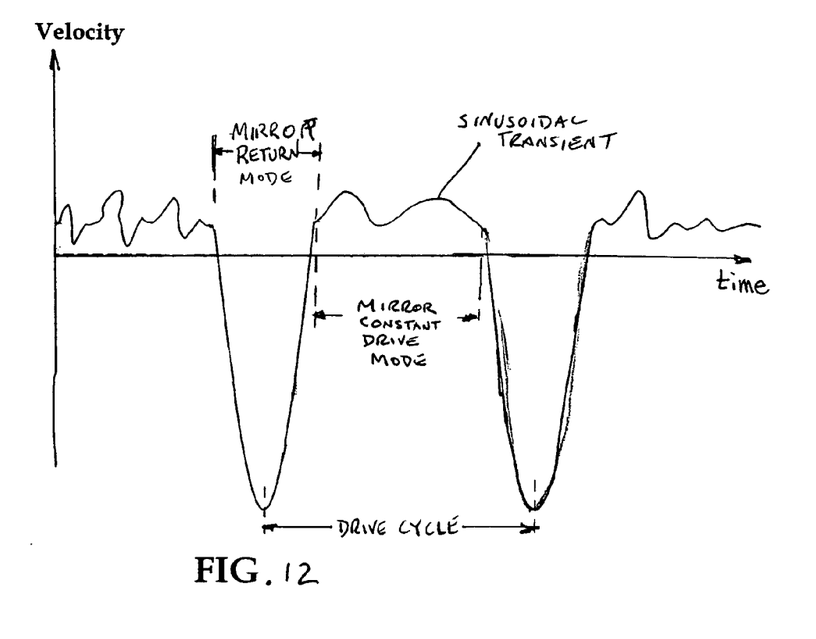
FIG. 12 is a graph analogous to FIG. 11 but showing the effects of electrical interference.

As previously mentioned by way of numerical example, a typical drive frequency, i.e., frame rate, is 60 Hz or 85 Hz, but other drive frequencies, such as 56 Hz, 72 Hz and 75 Hz, are also often used. The AC line frequency for energizing the electromagnetic coil 70 is typically 50 Hz or 60 Hz. If a harmonic of the drive frequency or the line frequency closely matches the resonant frequency of the scan mirror 68, then there is electrical interference, and a sinusoidal transient, such as depicted in FIG. 12, gets superimposed on the constant velocity portion of the velocity versus time graph. A non-distorted image requires the velocity to be substantially constant during the drive mode. However, the transient causes variations in the velocity, thereby distorting the image in an uncontrolled, unpredictable manner.

In accordance with this invention, the resonant frequency is adjusted so as to be as far as possible from the harmonics of the drive and line frequencies, subject to certain tradeoffs. The resonant frequency should be as high as possible to insure a fast return of the scan mirror 68, but should be as low as possible to minimize electrical power consumption by the drive 70. In the preferred embodiment, the resonant frequency is selected to be in a range from 270-280 Hz.

The resonant frequency of the scan mirror 68 is adjustable by changing such factors as the mass of the mirror 68 and/or the mass of the magnet 71 and/or the material of the flexure 200. However, it is preferred to maintain such factors constant and instead to vary the thickness and/or width of the torsion portions 204, 206. As previously noted, the nominal thickness of the torsion portions is on the order of 0.027 mm, and their width is on the order of 0.122 mm. Chemical etching to achieve these transverse dimensions is preferred to obtain the desired resonant frequency to be a non-integer multiple of the drive and line frequencies.

Figure 13:
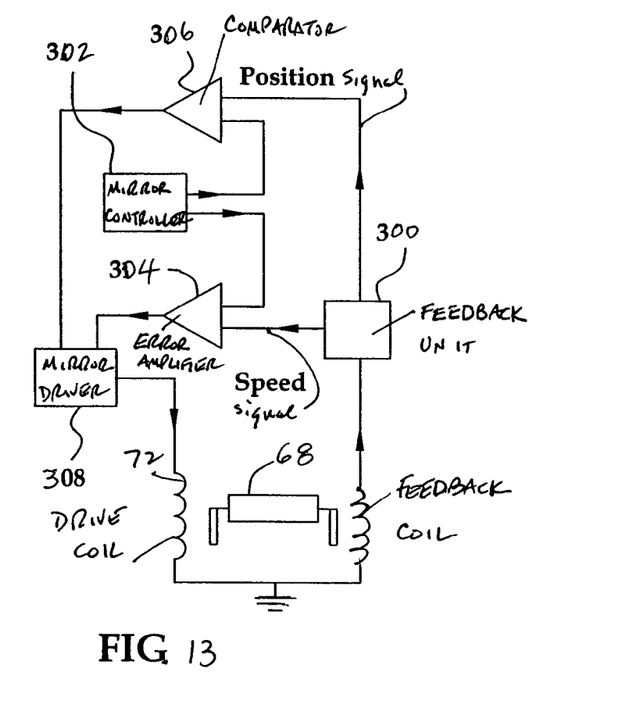
FIG. 13 is a drive circuit for driving the drive of FIG. 8.

FIG. 13 depicts an embodiment of a drive circuit operative for driving the scan mirror 68 at a substantially constant speed in one circumferential direction, permitting a rapid backward return movement at its resonant frequency in the opposite circumferential direction. A feedback unit 300 extracts speed and position information from a feedback signal and generates a speed signal for input to an error amplifier 304 and a position signal for input to a comparator 306. The feedback unit 300 typically includes a feedback coil mounted in proximity to the magnet 71 and operative for generating the feedback signal that tracks the drive signal generated by the drive coil 72.

A mirror controller 302 sets a desirable speed and outputs a reference speed signal to the error amplifier 304 for comparison with the mirror speed signal. The output of the scan amplifier 304 is fed to a mirror driver 308 which generates an output drive current to the drive coil 72 for continuously adjusting the speed of the scan mirror to match the reference speed set by the controller 302.

The controller 302 also sets an end limiting position and outputs an end position signal to the comparator 306 for comparison with the mirror position signal. The output of the comparator 306 is also fed to the mirror driver 308. When the mirror position signal matches the end position signal, the mirror driver 308 is switched to a high impedance state, thereby preventing the flow of the output drive current to the drive coil 72. The scan mirror 68 is thus set free to return at its resonant frequency by the energy stored in the twisted torsion portions. When the scan mirror reaches its opposite end limiting position, the comparator 306 switches the driver 308 back on, and a new drive cycle begins.

Figure 14:
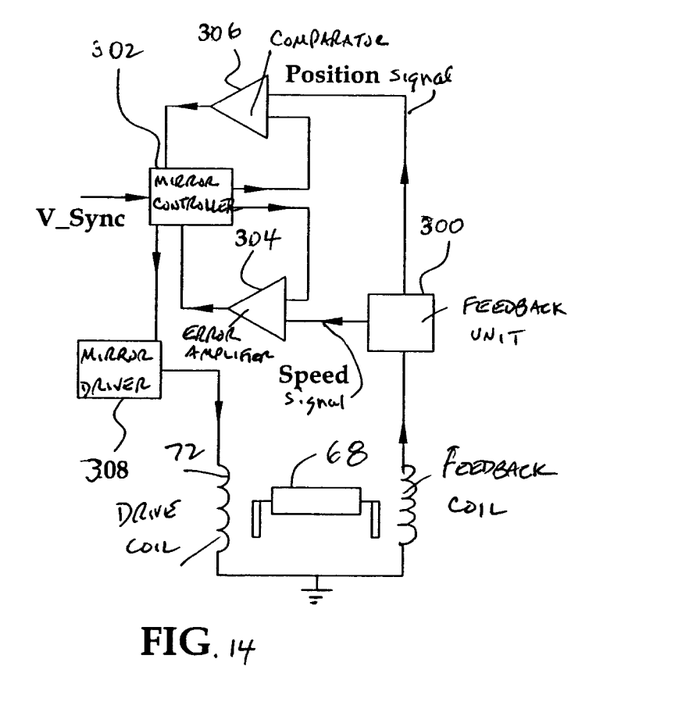
FIG. 14 is another drive circuit for driving the drive of FIG. 8.

The embodiment of FIG. 14 is analogous to that of FIG. 13, except that the mirror driver 308 is under the full control of the mirror controller 302. In this embodiment, instead of continuously adjusting the driver 308, the controller 302 repeats a predefined cycle, while making small incremental changes for successive cycles. Optionally, the controller 302 is synchronized with the vertical synchronization pulses from a host controller.

It will be understood that each of the elements described above, or two or more together, also may find a useful application in other types of constructions differing from the types described above.

While the invention has been illustrated and described as embodied in an arrangement for, and a method of, reducing image distortion due to electrical interference, especially for use in a color image projection arrangement and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. An arrangement for reducing image distortion in a projected image, comprising:
    a) a light source for generating a light beam;
    b) a pair of oscillatable scan mirrors;
    c) a drive assembly for oscillating the scan mirrors about mutually orthogonal axes to form a raster pattern of scan lines on a projection surface, each scan line having a number of pixels, the drive assembly including a drive energized by a supply line frequency and operable at a drive frequency for moving one of the scan mirrors in one circumferential direction about one of the axes at a substantially constant drive speed, the one scan mirror being returnable at a resonant frequency in an opposite circumferential direction about the one axis at a return speed greater than the drive speed;
    d) a controller for causing selected pixels in the scan lines to be illuminated, and rendered visible, by the laser beam to form the image on the projection surface; and
    e) means for adjusting the resonant frequency to be non-harmonically related to the drive frequency and the supply line frequency to reduce electrical interference between the resonant, drive and supply line frequencies and to resist image distortion.

2. The arrangement of claim 1, wherein the light source is a laser for emitting a laser beam as the light beam.

3. The arrangement of claim 1, wherein the drive includes a flexure on which the one scan mirror is mounted, and means for flexing the flexure in at least one of the circumferential directions about the one axis to cause the one scan mirror to move about the one axis.

4. The arrangement of claim 1, wherein the supply line frequency is one of 50 Hz and 60 Hz, and wherein the drive frequency is one of 60 Hz and 85 Hz, and wherein the resonant frequency is not an integer multiple of the supply line and the drive frequencies.

5. The arrangement of claim 3, wherein the flexure has longitudinal torsion portions extending along the one axis, each torsion portion having a transverse dimension; and wherein the resonant frequency is dependent on the transverse dimension.

6. A method of reducing image distortion in a projected image, comprising the steps of:
   a) generating a light beam;
   b) oscillating a pair of scan mirrors about mutually orthogonal axes to form a raster pattern of scan lines on a projection surface, each scan line having a number of pixels, the oscillating step being performed by energizing a drive with a supply line frequency, and by operating the drive at a drive frequency for moving one of the scan mirrors in one circumferential direction about one of the axes at a substantially constant drive speed, the one scan mirror being returnable at a resonant frequency in an opposite circumferential direction about the one axis at a return speed greater than the drive speed;
   c) causing selected pixels in the scan lines to be illuminated, and rendered visible, by the laser beam to form the image on the projection surface; and
   e) adjusting the resonant frequency to be non-harmonically related to the drive frequency and the supply line frequency to reduce electrical interference between the resonant, drive, and supply line frequencies and to resist image distortion.

7. The method of claim 6, wherein the light beam is generated by a laser.

8. The method of claim 6, wherein the drive includes a flexure on which the one scan mirror is mounted, and the step of flexing the flexure in at least one of the circumferential directions about the one axis to cause the one scan mirror to move about the one axis.

9. The method of claim 6, wherein the supply line frequency is one of 50 Hz and 60 Hz, and wherein the drive frequency is one of 60 Hz and 85 Hz, and wherein the resonant frequency is not an integer multiple of the supply line and the drive frequencies.

10. The method of claim 8, wherein the flexure has longitudinal torsion portions extending along the one axis, each torsion portion having a transverse dimension; and wherein the resonant frequency is dependent on the transverse dimension.

11. The method of claim 10, wherein the adjusting step is performed by etching the transverse dimension to a predetermined value.

12. An arrangement for reducing image distortion in a projected image, comprising:
   a) a light source for generating a light beam;
   b) a pair of oscillatable scan mirrors;
   c) a drive assembly for oscillating the scan mirrors about mutually orthogonal axes to form a raster pattern of scan lines on a projection surface, each scan line having a number of pixels, the drive assembly including a drive operable at a drive frequency for moving one of the scan mirrors in one circumferential direction about one of the axes at a substantially constant drive speed, the one scan mirror being returnable at a resonant frequency in an opposite circumferential direction about the one axis at a return speed greater than the drive speed, the drive including a flexure on which the one scan mirror is mounted, and means for flexing the flexure in at least one of the circumferential directions about the one axis to cause the one scan mirror to move about the one axis, the flexure having longitudinal torsion portions extending along the one axis, each torsion portion having a transverse dimension;
   d) a controller for causing selected pixels in the scan lines to be illuminated, and rendered visible, by the laser beam to form the image on the projection surface; and
   e) means for adjusting the resonant frequency which is dependent on the transverse dimension of each torsion portion to be non-harmonically related to the drive frequency to reduce electrical interference between the resonant and drive frequencies and to resist image distortion.

13. The arrangement of claim 12, wherein the light source is a laser for emitting a laser beam as the light beam.

14. The arrangement of claim 12, wherein the drive is energized by a supply line frequency, and wherein the adjusting means is also operative for adjusting the resonant frequency to be non-harmonically related to the supply line frequency.

15. The arrangement of claim 12, wherein the supply line frequency is one of 50 Hz and 60 Hz, and wherein the drive frequency is one of 60 Hz and 85 Hz, and wherein the resonant frequency is not an integer multiple of the supply line and the drive frequencies.

* * * * *